United States Patent [19]

Hutton et al.

[11] 4,043,956

[45] Aug. 23, 1977

[54] HYDROCURABLE OXAZOLIDINE POLYANHYDRIDE COMPOSITIONS

[75] Inventors: Thomas W. Hutton, Doylestown; John J. Miller, Warminster; Lawrence K. Wempe, Lansdale, all of Pa.; Sheldon N. Lewis, Zurich, Switzerland

[73] Assignee: Rohm and Haas Company, Philadelphia, Pa.

[21] Appl. No.: 558,523

[22] Filed: Mar. 14, 1975

[51] Int. Cl.$^2$ .................... C07D 261/00; C09D 3/74
[52] U.S. Cl. ................. 260/23 R; 252/8.57; 252/8.6; 252/182; 260/307 F; 260/823; 260/874; 428/461; 428/473; 428/511; 428/540
[58] Field of Search ............... 260/23 R, 307 F, 823, 260/874; 252/182, 8.57, 8.6; 428/461, 473, 511, 540

[56] References Cited

U.S. PATENT DOCUMENTS

| | | | |
|---|---|---|---|
| 3,037,006 | 5/1962 | Hankins et al. | 260/80.5 |
| 3,160,634 | 12/1964 | Hodge | 260/307 |
| 3,367,895 | 2/1968 | Clark | 260/307 F |
| 3,533,971 | 10/1970 | Austin et al. | 260/307 F |
| 3,535,332 | 10/1970 | Runge et al. | 260/307 F |
| 3,553,124 | 1/1971 | Donatello et al. | 260/307 F |
| 3,609,161 | 9/1971 | Dowbenko | 260/307 F |
| 3,661,923 | 5/1972 | Emmons et al. | 260/307 F |
| 3,743,626 | 7/1973 | Emmons | 260/77.5 AQ |
| 3,937,716 | 2/1976 | Lewis et al. | 260/307 FA |

*Primary Examiner*—Ronald W. Griffin

[57] ABSTRACT

Compositions comprising an oxazolidine and a polyanhydride cure in the presence of moisture to afford polymeric materials. The compositions can be used in forming caulks, films, fibers, paints, seamless flooring, coatings, impregnants and adhesives for both natural and synthetic materials.

18 Claims, No Drawings

HYDROCURABLE OXAZOLIDINE POLYANHYDRIDE COMPOSITIONS

This invention relates to compositions which comprise an oxazolidine and a polyanhydride which will cure in the presence of water to afford tough, chemically resistant polymeric materials.

The reaction of cyclic anhydrides with active hydrogen compounds such as amines and alcohols to form an amide acid or ester acid has been greatly studied in the prior art. Since anhydrides generally react quickly and efficiently at room temperature with amines containing an active hydrogen and with some alcohols, these two components usually must be mixed together only at the time and place at which reaction is desired. In order to make so called "one pot" formulations or compositions, in which the reacting materials are packaged together before using, it is desirable to have polymer forming compositions which are relatively stable on storage and which could be cured in the absence of any extensive heating and without specific addition of other materials.

It has now been found that compositions comprising an oxazolidine and a polyanhydride will cure in the presence of moisture to afford tough and useful polymeric materials. Many of these compositions can be stored in the absence of moisture without any significant reaction between the oxazolidine and the anhydride.

A wide variety of oxazolidines can be used in the compositions of the invention and any polyanhydride having two or more pendant anhydride groups will be suitable. The oxazolidines used in the compositions of the invention will have no active hydrogen atoms. By active hydrogen atoms are meant the hydrogen atoms of groups, such as primary and secondary amino and hydroxy, which readily undergo reaction with electrophilic reagents such as anhydrides. Compositions comprising oxazolidines having no active hydrogen atoms will generally have greater stability or pot life than compositions comprising oxazolidines having active hydrogen atoms. However, oxazolidines which have active hydrogen atoms and compositions comprising other materials which have active hydrogen atoms can also be employed to afford compositions having adequate stability and improved curing speed over prior art materials. In describing the compositions of this invention, the term "oxazolidine" includes both the five membered ring oxazolidines and the six membered ring tetrahydro oxazines and also includes compounds having two or more oxazolidine rings. Compounds having more than one oxazolidine ring are generally referred to herein as polyfunctional oxazolidines.

The oxazolidine substituents of the compounds useful in the compositions of the invention can be represented by the following general formula:

I

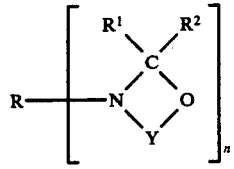

where R is an organic radical; $R^1$ is hydrogen, phenyl, benzyl or $C_1$–$C_{12}$ alkyl; $R^2$ is hydrogen or $C_1$–$C_4$ alkyl or $R^1$ and $R^2$ can be joined together with the carbon atom to which they are attached to form a 5- or 6-membered saturated carbon ring, Y is a radical of the formula:

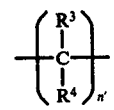

where $n'$ is an integer of 2 or 3 and $R^3$ and $R^4$ are the same or different radicals selected from hydrogen, $C_1$–$C_{12}$ alkyl, $C_6$–$C_{10}$ aryl or $C_7$–$C_{12}$ aralkyl or alkaryl and $n$ is an integer equal to the valence of R. The groups represented by $R^1$, $R^2$, $R^3$ and $R^4$ can be susbtituted with halo, alkoxy, nitro, and the like and in some embodiments can also have active substituents, such as hydroxy, amino and the like.

Five types of oxazolidines are among the preferred oxazolidines for the compositions of the invention: (1) polyfunctional polyol ester oxazolidines; (2) polyfunctional polycarboxylic ester oxazolidines; (3) monofunctional ester oxazolidines; (4) polymers and copolymers of oxazolidinylalkyl acrylates and methacrylates and (5) aliphatic and aromatic mono- and bisoxazolidines.

A preferred class of polyfunctional polyol ester oxazolidines has the following general formula:

II

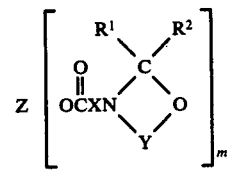

where $R^1$, $R^2$ and Y are as defined above; m is an integer of 2 to 4 and is equal to the valence of Z; Z is a divalent alkylene radical or a tri- or tetravalent hydrocarbon radical, a monovalent $C_1$–$C_{18}$ alkyl, a $C_3$–$C_{12}$ cycloalkyl, a $C_6$–$C_{12}$ aryl or a $C_7$14 $C_{15}$ aralkly or alkaryl and X is a radical of the formula:

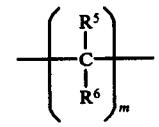

where m is an integer of 2 to 4 and $R^5$ and $R^6$ are the same or different radicals selected from hydrogen or unsubstituted or substituted $C_1$–$C_6$ alkyl.

Compounds of Formula II can be produced by reacting an oxazolidine having ester functionality with a saturated or ethylenically unsaturated polyol which can contain aryl groups such as phenylene and the like to effect the transesterification of the oxazolidine. The starting monofunctional oxazolidine used in the transesterification reaction can be produced in a Michael addition reaction wherein an oxazolidine having a hydrogen atom on the ring nitrogen is reacted with an ester of an α, β-ethylenically unsaturated carboxylic acid to form as the Michael addition product an oxazolidinyl alkanoate ester. Preferably an ester of acrylic or methacrylic acid will be used thus forming the propionate or isobutyrate ester, respectively. Alternatively, a primary alkanolamine is reacted with an ester of α, β-ethylenically unsaturated carboxylic acid to form a Michael addition product. The Michael addition product is then further reacted with an appropriate carbonyl compound, such as an aldehyde or ketone to produce a monofunctional oxazolidine having ester functionality. For example, when an acrylate ester is used as the starting material in the Michael addition reaction, the Michael addition product is a β- substituted propionate ester.

The polyfunctional polyol ester oxazolidine of Formula II and also the intermediate monofunctional oxazolidines formed by reacting the Micheal addition product with the appropriate carbonyl compound, which can also be reacted with the polyanhydrides, are further described in U.S. Pat. No. 3,661,923 which patent is hereby incorporated by reference.

A preferred class of polyfunctional polycarboxylic ester oxazolidines has the following general formula:

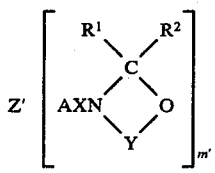

III where $R^1$, $R^2$, X and Y are as defined above; $m'$ is an integer of at least two, preferably two or three and is equal to the valence of $Z'$; $Z'$ is an open or branched chain saturated, polyvalent alkylene hydrocarbon radical, which may contain one or more hydrocarbon rings, preferably having from 1 to 39 carbon atoms, a phenylene, a halo substituted phenylene, a $C_1$–$C_8$ alkyl substituted phenylene, the divalent hydrocarbon residue of 1,1,3-trimethyl-5-carboxy-3-(p-carboxyphenyl)indane, a $C_2$–$C_3$ unsaturated alkenyl divalent radical or O=C<; and A is

(the left valence being connected to the Z' radical) or when Z' is

then A is —O —.

Compounds of Formula III can be produced by reacting a hydroxyl terminated oxazolidine with an ester of a polybasic aliphatic or aromatic acid to effect the transesterification of the polyester. The monofunctiona oxazolidine used as the transesterifying agent can be produced by reacting a secondary amine, such as a secondary alkanolamine, with an appropriate carbonyl compound, such as an aldehyde or ketone, to produce an N-hydroxyalkyloxazolidine which is a cyclic amino alcohol of the general formula:

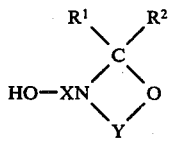

wherein X, $R^1$, $R^2$ and Y are as defined above.

The polyfunctional polycarboxylic oxazolidines are disclosed in U.S. Pat. No. 3,743,626 which is hereby incorporated by reference.

A third preferred class of polyfunctional oxazolidines are the polymers and copolymers of oxazolidinylalkyl acrylates and methacrylates having the formula:

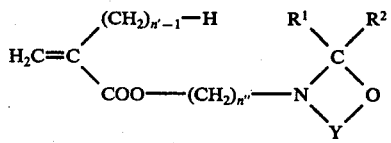

IV wherein $R^1$, $R^2$ and Y are as defined above; $n'$ is 1 or 2 and $n''$ is 2 or 3. The preparation of these polymers and copolymers is disclosed in U.S. Pat. No. 3,037,006 which is incorporated by reference.

Another preferred class of oxazolidines embraces those derived from simple aliphatic and aromatic diamines, such as those having the formula:

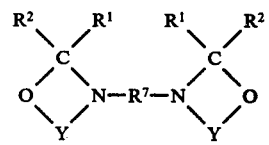

V wherein $R^1$, $R^2$ and Y are as defined above, and $R^7$ is a divalent, saturated or unsaturated, alkylene radical having 1 to 38 carbon atoms, a divalent arylene radical having 6 to 18 carbon atoms or a divalent aralkylene or alkarylene radical, having 7 to 25 carbon atoms. $R^7$ can also have substituents such as nitro, halo, alkoxy, hydroxy and the like which will not substantially interfere with the curing reaction, $R^7$ can also be branched- or straight chain and can be acyclic or contain a hydrocarbon ring.

Furthermore, oxazolidines derived from triamines, tetramines, and other polyamines are also useful in the invention. Such oxazolidines are also represented by the general formula:

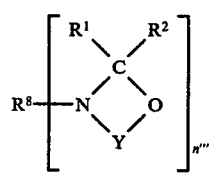

VI wherein $R^1$, $R^2$ and Y are defined above; $R^8$ is a polyvalent alkylene, arylene, aralkylene or alkarylene radical similar to $R^7$ above and $n'''$ is an integer equal to the valence of $R^8$.

Oxazolidines having Formula V or Formula VI are well known in the art. Generally, such compounds can be prepared from a polyamine by first reacting the amine with an alkylene oxide, such as ethylene oxide, propylene oxide or related compounds, to form the corresponding alkanolamine, followed by reaction with an aldehyde or ketone to form the oxazolidine compound. Other methods well known in the art can also be used in preparing these oxazolidines.

Examples of oxazolidines having Formula V or Formula VI include: 1,2-bis(1,3-oxazolidin-3-yl)ethane; 1,8-bis(1,3-oxazolidin-3-yl)menthane; bis[4-(3-oxazolidinyl)-phenyl]methane; bis(1,3-oxazolidin-3-yl)methane; 2-nitro-1,3-bis(1,3-oxazolidin-3-yl)propane and related compounds disclosed in U.S. Pat. No. 3,160,634 and hereby incorporated by reference; 1,1-bis(1,3-tetrahydrooxazin-3-yl)methane; bis(1,3-oxazolidin-3-yl)toluene; bis(1,3-oxazolidine-3-yl)xylene; 1,6-bis(1,3-oxazolidin-3-yl)hexane; 1,12-bis(1,3-oxazolidin-3-yl)dodecane; 2,2,4-trimethyl-1,6-bis(1,3-oxazolidin-3-yl)hexane; 3,5,5-trimethyl-1-(1,3-oxazolidine-3-yl)-3-[(1,3-oxazolidin-3-yl)methyl]cyclohexane; 1,6-bis-(1,3-oxazolidin-3-yl)hexane-3 and the like. Other oxazolidines can be prepared readily from other well known polyamines.

Furthermore, other types of oxazolidines which are well known in the art are also useful in the compositions of the invention, including those having the following structural formula:

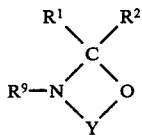

where $R^9$ is ($C_1$–$C_{12}$) alkyl, phenyl, benzyl, ($C_6$–$C_{10}$) aryl or ($C_7$–$C_{12}$) aralkyl. $R^9$ can be substituted with halo, alkoxy, nitro, acyloxy and the like, and in some embodiments can also have active substituents, such as hydroxy, amino and the like. Also included are compounds having the following structural formula:

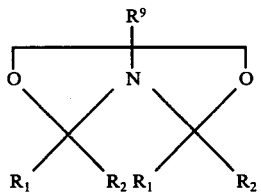

where $R^1$, $R^2$ and $R^9$ are as previously defined.

A wide variety of anhydrides may be employed in the compositions of this invention. The term polyanhydride is meant to embrace polymers having two or more pendant anhydride groups since those anhydrides with internal anhydride groups i.e.,

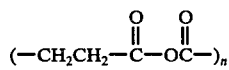

when reacted with oxazolidines and water will not cure. It should be noted that any polyanhydride having pendant anhydride groups will react with the oxazolidines to afford hydrocurable compositions. Preferred are those polyanhydrides prepared from maleic anhydride and one or more monomers selected from $C_1$–$C_{18}$ alkyl acrylate or methacrylate; a polyunsaturated fatty acid derivative such as tung oil, an α-olefin such as 1-octene, 1-decene, 1-dodecene, 1-hexadecene and the like, vinyl ethers such as methylvinyl ether, butyl vinyl ether and the like, vinyl acetate, ethylene or styrene. Especially preferred is the polyanhydride prepared from polyunsaturated fatty acid esters and most preferably tung oil and maleic anhydride and the polyanhydride prepared from $C_3$–$C_6$ acrylates and methacrylates and most preferably butyl acrylate and maleic anhydride.

The reaction of tung oil with maliec anhydride affords a polyanhydride product having the structure:

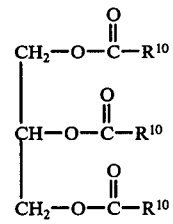

wherein $R^{10}$ is

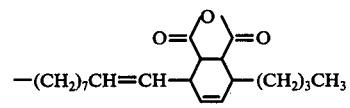

The polymerization of butyl acrylate and maleic anhydride affords a polyanhydride which is a butyl acrylate maleic anhydride random copolymer.

Especially useful, as vehicles for low shrinkage reactive caulks in one pot systems, are those containing oxazolidines having substituents in the two position including those blends of tung oil maleic anhydride with copolymers of butyl acrylate 2-isopropyloxazolidinylethyl acrylate and butyl acrylate 2-phenyloxazolidinylethyl acrylate which contain an anhydride oxazolidine equivalent ratio in the range 3.0–0.5. Especially useful as adhesive compositions are blends of a tung oil maleic anhydride adduct and bis-isopropyloxazolidinylethyl adipate or azelate which contain an anhydride oxazolidine equivalent ratio in the range 3.0–0.1.

The compositions of the invention are generally quite unreactive and relatively stable in the absence of moisture. However, when the compositions come into contact with moisture, they are rapidly cured to tough, solid polymeric materials. Since water is the agent which effects the curing of the compositions, they are defined as hydrocurable compositions.

The reaction between the oxazolidine component and the anhydride component of the composition is initiated by contact with water. Even a trace amount of atmospheric moisture is generally sufficient to initiate the reaction. The continued reaction naturally requires more water for curing since it is a reactant. If desired, water may be added directly to the compositions to effect cure but this it not necessary since atmospheric moisture will effect reaction. It is believed that the polymeric materials formed from the compositions of the invention result from the rapid hydrolysis of the oxazolidine ring at one of the bonds to the oxygen atom. The following reaction sequence illustrates the postulated path of the hydrolysis:

VII

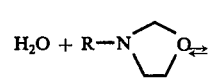

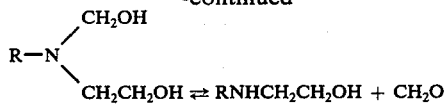

-continued $$R-N\begin{matrix}CH_2OH\\ \\CH_2CH_2OH\end{matrix} \rightleftarrows RNHCH_2CH_2OH + CH_2O$$

The amino alcohol which is produced during the hydrolysis has two active hydrogen sites which will react rapidly with the anhydride as illustrated by the following equation:

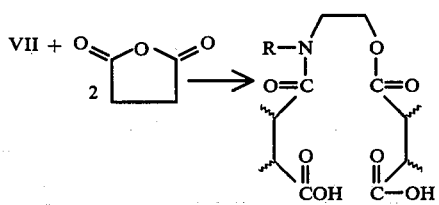

Although the polyanhydride can react with either the amino group or the hydroxy group, it is believed that reaction preferentially occurs with the amino group. Since the polyanhydride is polyfunctional and the oxazolidine reacts in the presence of water as a polyfunctional compound, their reaction as described above will produce a highly polymeric material. Of course, a compound having more than one oxazolidine group will react as a polyfunctional material even if the polyanhydride and oxazolidine are present in such proportions as to cause primary reaction during cure with the amine functionality only. While the hydrocuring reaction, that is, the hydrolysis and ensuing polymerization, will normally occur rapidly at ambient temperatures, elevated temperatures may facilitate reaction and curing under some conditions.

The ratio of polyanhydride to oxazolidine in the compositions of the invention is not critical and can be varied greatly to influence the nature and properties of the polymeric material which will be formed. For example, the polyanhydride and oxazolidine can be present in ratios such that reaction during cure will primarily take place between the polyanhydride and the amino group of the hydrolyzed oxazolidine. In general, the ratio of molar equivalents of polyanhydride to oxazolidine in the compositions will be from about 1:10 to about 10:1, and the preferred ratio is from about 0.8:1 to about 2.5:1.

The compositions of the invention need not contain a solvent, but a suitable inert solvent can be added to the composition, if desired, either at the time of original formulation or at the time of use. The rates of the hydrolysis of the oxazolidine and the subsequent reaction with polyanhydride can be influenced by the presence of a solvent. Solvents which are suitable for use in the compositions of the invention should be free or substantially free of active hydrogen atoms as determined by the Zerewitinoff method, described in Kohler et al., *J. Am. Chem. Soc.*, 40, 2181-8 (1927), and should also be substantially anhydrous. Included among the solvents which can be used are toluene, xylene, aliphatic hydrocarbons, isopropyl ether, ethyl acetate, β-ethoxyethyl acetate, methyl ethyl ketone and the like, as well as mixtures of such solvents. Pigments, dyes, fillers, antioxidants and antiozodants, stabilizers, flow control agents or other optional ingredients can also be included in the compositions of the invention.

The compositions of the invention can be used in forming films, fibers, paints, lacquers, varnishes, seamless flooring, caulks and as coatings, impregnants and adhesives for both natural and synthetic materials, such as paper, textiles, wood, plastics, metal and leather, as binders for nonwoven fabrics and in a wide variety of other uses. To prepare coatings and films, the compositions of the invention can be applied with or without solvent by casting premanently or removably onto a suitable substrate.

The compositions of the invention provide an improved combination of increased pot life and increased curing speed with respect to those combinations which contain compounds having free amine groups.

Various embodiments of the compositions of the invention and the polymeric materials formed from them exhibit a number of desirable and advantageous properties. Some of the compositions can be sealed in a single package so that if moisture is excluded, undesirable thickening or gelling do not occur during storage. Even those compositions that are not extremely stable in one pot formulations offer improved stability over conventional two-pot urethane systems. Since exposure to atmospheric moisture will effect cure, no additional materials need be mixed with these compositions at the time of use, thus facilitating greatly their handling. Furthermore, when no solvent is incorporated in the compositions, they are extremely high solids coating materials. When some of the compositions are used for impregnation of leather, they provide significant improvement in break over known urethane systems.

The following examples will further illustrate this invention but are not intended to limit it in any way.

EXAMPLE 1

Low Molecular Weight Butyl Acrylate Polymer

To a four-necked, five-liter flask equipped with an addition funnel, thermometer, stirrer and reflux condenser with a nitrogen feed line is added xylene (1400 g.). While the xylene is brought to reflux, a monomer mix of butyl acrylate (2000 g.) and AIBN (24 g.) is prepared and placed in the addition funnel. The monomer mix is added to the refluxing xylene at a constant rate over a period of three hours. The reaction mixture is relfuxed 0.25 hours before the addition of a chaser catalyst prepared from xylene (300 g.) and AIBN (4.7 g.). The chaser catalyst is added at a constant rate over 0.75 hours. The reaction mixture is refluxed an additional 0.25 hours, cooled and bottled. Solids - 55.1%; Conversion - 101.8%; Viscosity - 18 cps.

EXAMPLE 2

Transesterification of Butyl Acrylate Polymer With 2-Isopropyl-3-(β-hydroxyethyl)oxazolidine Polymeric butyl acrylate (1610 g., 55.9% solution in toluene, viscosity 27.5 cps.) and xylene (771 g.) is charged to a 5-liter, round bottomed flask equipped with a 10-plate Oldershaw column, stirrer and thermometer. Distillate (900 g.) is removed from the pot and to the pot mixture is then added xylene (729 g.), dibutyltin oxide (4.4 g.) and 2-isopropyl-3-(β-hydroxyethyl)oxazolidine (147 g., 96% purity). A butanol-rich distillate (285 g.) is collected as the reaction temperature increases from 144° to 148° C. GLC analysis of the reaction mixture indicates a 96.5% conversion of 2-isopropyl-3-(β-hydroxyethyl)oxazolidine. The product is stripped to 95.8% solids and by titration with N/10 HClO$_4$ in acetic acid is found to contain 0.876 meq. of basic nitrogen/g.

EXAMPLE 3

Oligomeric Butyl Acrylate

To a dry reaction flask equipped with stirrer, thermometer, condenser and addition funnel is added xylene (123 g.) and potassium tert-butoxide (19 g.). While maintaining a blanket of nitrogen, butyl acrylate (1090.0 g.) is added over a one-hour period at a reaction temperature of 67°–73° C. After the addition is completed, the contents are held at 70° C. for three hours and then quenched by the addition of 99% sulfuric acid (9.0 g.). The contents are stirred for 15 minutes and stripped of solvent and unreacted butyl acrylate at 135° C. and 30 mm. Hg. The contents are cooled to afford a light yellow syrup of 97% solids and 500 cps viscosity.

EXAMPLE 4

Transesterification of Butyl Acrylate Oligomer With 2-Isopropyl-3-($\beta$-hydroxyethyl)oxazolidine By following substantially the procedure described in Example 2, oligomeric butyl acrylate (1382 g.) is transesterified with 2-isopropyl-3-($\beta$-hydroxyethyl)oxazolidine (463 g.). A 92% conversion of the oxazolidine is realized and on stripping to 88.4% solids, the product is found to contain 1.64 meq. of basic nitrogen/g.

EXAMPLE 5

Transestrification of Butyl Acrylate Polymer With 2-Phenyl-3-($\beta$-hydroxyethyl)oxazolidine By following substantially the procedure of Example 2, butyl acrylate polymer (1355 g.) is transesterified with 2-phenyl-3-($\beta$-hydroxyethyl)oxzolidine (550 g.). A 98% conversion of oxazolidine is realized and on stripping to 87.2% solids, the product is found to contain 1.505 meq. basic nitorgen/g.

EXAMPLE 6

Copolymer of Butyl Acrylate and 2-Isopropyl-oxazolidinylethyl Methacrylate

A 3-liter, four-necked flask equipped with an addition funnel, stirrer, thermometer and condenser is maintained under a nitrogen atmosphere. A monomer mix is prepared from butyl acrylate (897 g.), 2-isoproyl-oxazolidinylethyl methacrylate (105.4 g., 94.9% and azoisobutyronitrile (AIBN 2.5 g.) initiator. The monomer mix is added at a continuous rate over 3 hours to refluxing toluene (700 g.) contained in the reaction vessel. After the monomer addition is complete, the pot contents are held at reflux for 0.25 hours and then treated with a chaser catalyst solution prepared from AIBN (5 g.) and toluene (102.5 g.) by a gradual addition over a period of 0.75 hours. A solids determination indicated 100% conversion of monomer. The product is stripped of solvent to 95.4% solids; viscosity 13,750 cps; 0.411 meq. basic nitrogen/g.

EXAMPLE 7

Tung Oil Maleic Anhydride Product

A two-liter resin kettle equipped with a stainless steel stirrer, stainless steel immersion coil for steam heating, thermometer and reflux condenser is charged with 238.2 g. of maleic anhydride and 890.5 g. of tung oil (Pacific Vegetable Oil Corporation). Steam heating is applied to melt the maleic anhydride (60°–70° C and discontinued at 70° C.). The exothermic reaction then proceeds spontaneously, reaching a maximum temperature of 132.5° C. The mixture is allowed to cool to 97° C. when steam heat is again applied and maintained for a total reaction time of 2 hours. The product weighs 1127 g. and contains 0.37% unreacted maleic anhydride (1.75% of charged maleic anhydride). Anhydride titration gives a value of 2.19 meq. anh./g. (anhydride functionality 2.43). The clear amber liquid has a Gardner-Holdt viscosity at 25° of Z-6+, contains 2.17 ± 0.04 meq. of anhydride/g., 0.05 meq. free acid/g. and less than 1.0% free maleic anhydride.

EXAMPLE 8

Butyl Acrylate/Maleic Anhydride (90/10 Copolymer

To a three-liter, 4-necked, round-bottomed flask eqipped with a stirrer, thermometer, condenser and addition funnel is added 338.6 g. toluene, 142.5 g. of butyl acrylate 22.5 g. maleic anhydride and 0.5 g. of t-butyl peroctoate. The contents are heated to reflux (144° C.) and held for 15 minutes. A monomer mixture composed of 757.5 g. of butyl acrylate, 77.5 g. maleic anhydride and 2.5 g. of t-butyl peroctoate is fed at a uniform rate over the next 2¾ hours to the reaction contents held at 115° C. The mixture is then held at 115° C. for 15 minutes and then chased with 3.0 g. t-butyl peroctoate dissolved in 97 g. of toluene fed over 45 minutes. The reaction flask is equipped with a Dean-Stark apparatus and azeotroped to dryness — 19.5 g. of water and toluene are removed. The product has 69.8% solids (99.3% monomer conversion) with a viscosity of 3640 cps. (91.7% of the maleic anhydride is converted to polymer and the polymer has a number average molecular weight of 10,000; therefore, an anhydride functionality of 10.)

EXAMPLE 9

Low Molecular Weight Butyl Acrylate/Maleic Anhydride (85/15 Copolymer)

To a three liter, four necked, round bottomed flask equipped with a stirrer, thermometer, condenser and addition funnel is charged 600 g. of xylene. The flask contents are heated to 139°–140° C. while a monomer mixture of 225 g. maleic anhydride, 1275 g. butyl acrylate and 60 g. of 75% t-butyl peracetate is fed at a uniform rate over a period of 3¼ hours. The reaction mixture is held at 140° C. for 15 minutes and then chased with 6.0 g. of 75% t-butyl peracetate dissolved in 40 g. of xylene fed over 45 minutes. The reaction flask is equipped with a Dean-Stark apparatus and azeotroped to dryness - (18.6 g. of water and toluene is removed). The product contains 72.2% solids with a viscosity of 205 cps. A sample is stripped to 99.4% solids and has a viscosity of 272,000 cps. No maleic anhydride could be detected in the final product and the polymer is found to have a number average molecular weight of 1500; anhydride functionality of 2.3

EXAMPLE 10

Butyl Acrylate/Maleic Anhydride (90/10 Copolymer)

By following substantially the procedure of Example 8 and by substituting for the 0.5 g. of t-butyl peroctoate in the initial pot charge, 1.3 g. of t-butyl peroctoate and by substituting for the 2.5 g. of t-butyl peroctoate 6.7 g. of t-butyl peroctoate in the monomer feed mix, there is obtained a copolymer of butyl acrylate and maleic anhydride at 69.9% solids with a viscosity of 1890 cps (97.1% conversion of maleic anhydride).

EXAMPLE 11

Preparation of an Oxazolidine Polyanhydride Hydrocurable Adhesive

To the copolymer of Example 8 (40 g.) is added N-methyl-2-isopropyl oxazolidine (3.95 g.), a thin film of the mixture is exposed to atmospheric moisture for four hours at the end of which time the fluid mixture has cured to a tacky adhesive.

EXAMPLE 12

Hydrocurable Adhesives of Oxazolidine Anhydride Compositions

An adhesive mixture is prepared by mixing the tung oil/maleic anhydride adduct of example 7 (100 g.) with bis-isopropyloxazolidinylethyl adipate (50.6 g.). Strips of cloth are immersed in the adhesive and any excess adhesive is doctored off and the saturated strips are placed on the surface of the test adherend, covered with polyethylene and rolled with a 2 lb. rubber roller. The polyethylene cover is removed and the cotton adherend laminate is cured at 77° C. and 50% relative humidity for 7 days. The specimens are trimmed to 1 inch width and peel tested (180° peel resistance, ASTM D-1976) with a crosshead travel rate of 10″/min. The specific adhesive values are reported in the following Table I.

TABLE I

| Substrate | Specific Adhesion Peeling Force (g./in. width) |
| --- | --- |
| Cotton | 4980 |
| Wood | 4992 |
| Steel, Cold-Rolled | 4902 |
| Polyethylene, Treated | Substrate Failure |
| Aluminum | 484 |
| Vinyl | 312 |
| "Mylar" | 120 |

EXAMPLE 13

Caulk Binder

This example illustrates the preparation of a typical caulk binder, its thermal stability in the absence of water and its cure when exposed to moisture at room temperature. Compositions were prepared by mixing thoroughly the polyoxazolidines of either Examples 4 or 5 and the polyanhydride of Example 7. The compositions are described in Table II.

TABLE II

| | Caulk Vehicle Compositions | | | |
| --- | --- | --- | --- | --- |
| | Poly-oxazolidine Component | Polyanhydride of Example 7 | Equivalent Ratio | Solids |
| Example | From Ex. No. | Wgt. (g.) | Wgt. (g.) | Polyanhydride/oxazolidine | % |
| A | 5 | 61.9 | 43.6 | 1.0 | 92.4 |
| B | 5 | 60.4 | 63.8 | 1.5 | 93.7 |
| C | 5 | 50.3 | 70.8 | 2.0 | 94.7 |
| D | 5 | 36.6 | 77.2 | 3.0 | 95.8 |
| E | 5 | 30.3 | 85.4 | 4.0 | 96.6 |
| F | 4 | 65.4 | 50.7 | 1.0 | 93.4 |
| G | 4 | 51.5 | 59.9 | 1.5 | 94.5 |
| H | 4 | 41.3 | 63.9 | 2.0 | 96.1 |
| I | 4 | 36.9 | 85.8 | 3.0 | 96.5 |

A sample of each composition is placed in a sealed, evacuated glass tube, heated to 50° C. for 31 days with the sample's initial and final viscosity measured. The results are contained in Table III.

TABLE III

| | Stability to Heat (50°, 31 days) Viscosity (cps) | |
| --- | --- | --- |
| Example | Initial | Final |
| A | 18,500 | 32,000 |
| B | 22,500 | 35,000 |
| C | 25,000 | 39,000 |
| D | 27,500 | 45,000 |
| E | 31,000 | 45,000 |
| F | 14,250 | 45,000 |
| G | 17,500 | 79,000 |
| H | 21,000 | >100,000 |
| I | 26,000 | >100,000 |

A sample of each composition is spread on a glass plate to a film about 1 mm. thick. The films are exposed to the atmosphere at room temperature for two months and then examined. Results are contained in Table IV.

TABLE IV

| | Room Temperature Cure Results | | |
| --- | --- | --- | --- |
| Example | Strength | Elasticity | Tack Free |
| A | OK | OK | Yes |
| B | OK | OK | Yes |
| C | OK | OK | Yes |
| D | Weaker than A | OK | Yes |
| E | Weaker than A | OK | Slight Tack |
| F | OK | OK | Yes |
| G | OK | OK | Yes |
| H | OK | OK | Yes |
| I | OK | OK | Yes |

EXAMPLE J

Caulk Formulation

This example illustrates the formulation of a caulk composition. A binder mix is prepared from a 0.8:1 to 1.2:1 equivalent ratio (polyanhydride/oxazolidine) of tung oil maleic anhydride and the butyl acrylate/oxazolidinylethyl acrylate of Examples 4 or 5.

The caulk is formulated by blending the following:

| | Parts |
| --- | --- |
| Binder Mix | 44.5 |
| Camel Carb[1] | 41.2 |
| Texas Talc[2] | 9.4 |
| Thixatrol ST[3] | 4.4 |
| Mol. Sieve 520 (5A)[4] | 0.5 |
| | 100.0 |
| Pigment/Binder 1.24 | |

[1]H. T. Campbell Co.
[2]Whittaker, Clark and Daniels Co.
[3]Baker Castor Oil.
[4]Davison Co.

TABLE IV

| Composition | Caulk Properties | |
| --- | --- | --- |
| | A[1] | B[2] |
| Binder Ratio (Anhydride/Oxazolidine)[3] | 1.15 | 1.14 |
| Binder Properties:[4] | | |
| Tensile Strength (psi) | 223 | 183 |

TABLE IV-continued

| Composition | Caulk Properties | A[1] | B[2] |
|---|---|---|---|
| Elongation (%) | | 241 | 209 |
| % Recovery at 25% Elongation | | 53 | 62 |
| Caulk Properties: | | | |
| 1. Adhesion[5] | | | |
| Peel Adhesion | | 0.4 AF | 2.9 CF |
| Glass-initial | | 0.4 CF | 3.9 CF |
| Aluminum-initial | | 1.8 CF | 4.1 CF |
| Wood-initial | | 3.3 CF | 3.4 CF |
| 2. Cracking Channel | | | |
| Aluminum, 7 days/23° C. | | OK | OK |
| Aluminum, 7 days/50° C. | | OK | OK |
| Wood, 7 days/23° C. | | OK | OK |
| 3. Shore A Hardness | | | |
| 7 days/23° C. | | 54 | 50 |
| 7 days/50° C. | | 57 | 59 |

[1]Composition A: oligomer of BA/β-(2-phenyl-N-oxazolidinyl)-ethyl acrylate (58/42) from Example 5 with Tung oil/maleic anhydride
[2]Composition B: oligomer of BA/β-(2-isopropyl-N-oxazolidinyl)ethyl acrylate (62/38) from Example 4 with Tung oil/maleic anhydride
[3]Molar equivalent ratios
[4]Seven day, air-dried at ambient temperature
[5]Lbs./inch; AF=adhesive failure; CF—cohesive failure.

What is claimed is:

1. A hydrocurable composition comprising a polyanhydride having two or more pendant anhydride groups and an oxazolidine of the formula:

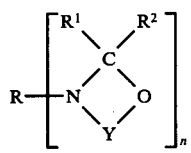

wherein R is an organic radical; $R^1$ is hydrogen, phenyl, benzyl or $C_1$-$C_{12}$ alkyl; $R^2$ is hydrogen or $C_1$-$C_4$ alkyl or $R^1$ and $R^2$ are joined together with the carbon atom to which they are attached to form a five- or six-membered saturated carbon ring; Y is a radical of the formula

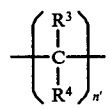

wherein $n'$ is an integer of 2 or 3 and $R^3$ and $R^4$ are the same or different radicals selected from hydrogen, $C_1$-$C_{12}$ alkyl, $C_6$-$C_{10}$ aryl or $C_7$-$C_{12}$ aralkyl or alkaryl and $n$ is an integer equal to the valence of R.

2. The composition of claim 1 wherein the polyanhydride is prepared from maleic anhydride and one or more materials selected from $C_1$-$C_{18}$ alkyl acrylate or methacrylate, a polyunsaturated fatty acid ester, an α-olefin, a vinyl ether, vinyl acetate, ethylene or styrene.

3. The composition of claim 2 wherein the polyanhydride is prepared from maleic anhydride and either a polyunsaturated fatty acid ester or a $C_3$-$C_6$ acrylate or methacrylate.

4. The composition of claim 3 wherein the polyunsaturated fatty acid ester is tung oil and the acrylate is butyl acrylate.

5. The composition of claim 1 wherein the oxazolidine has the following structural formula:

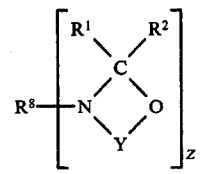

wherein $R^1$ is hydrogen, phenyl, benzyl or a $C_1$-$C_{12}$ alkyl; $R^2$ is hydrogen or $C_1$-$C_4$ alkyl or $R^1$ and $R^2$ are joined together with the carbon atom to which they are attached to form a saturated five- or six-membered carbon ring and Y is a radical of the formula:

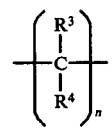

wherein $n$ is 2 or 3 and $R^3$ and $R^4$ are the same or different radicals selected from hydrogen, $C_1$-$C_{12}$ alkyl, $C_6$-$C_{10}$ aryl or $C_7$-$C_{12}$ aralkyl or alkaryl groups; $R^8$ is a saturated or unsaturated alkyl or polyvalent alkylene radical having up to 38 carbon atoms, aralkyl, alkaryl, polyvalent aralkylene or polyvalent alkarylene radical having up to 25 carbon atoms or an aryl or polyvalent arylene radical having up to 18 carbon atoms and Z is an integer equal to the valence of $R^8$.

6. The composition of claim 1 wherein the oxazolidine has the following structural formula:

$$Z\left[\begin{array}{c} R^1 \diagdown \diagup R^2 \\ \underset{\text{OCXN}}{\overset{O}{\|}} \diagup \overset{C}{\diagdown} O \\ \diagdown Y \diagup \end{array}\right]_m$$

wherein $R^1$ hydrogen, phenyl, benzyl or $C_1$-$C_{12}$ alkyl; $R^2$ is hydrogen or $C_1$-$C_4$ alkyl or $R^1$ and $R^2$ are joined with the carbon atom to which they are attached to form a five- or six-membered carbon ring; $m$ is an integer of 2-4; Y is the radical $$\left(\begin{array}{c} R^3 \\ | \\ -C- \\ | \\ R^4 \end{array}\right)_n$$

wherein $n$ is 2 or 3 and $R^3$ and $R^4$ are the same or different radicals selected from hydrogen, $C_1$-$C_{12}$ alkyl, $C_6$-$C_{10}$ aryl or $C_7$-$C_{12}$ aralkyl or alkaryl; Z is a divalent alkylene, a tri- or tetravelent hydrocarbon radical, a monovalent $C_1$-$C_{18}$ alkyl, a $C_3$-$C_{12}$ cycloalkyl, a $C_6$-$C_{12}$ aryl or a $C_7$-$C_{15}$ aralkyl or alkaryl; X is the radical $$\left(\begin{array}{c} R^5 \\ | \\ -C- \\ | \\ R^6 \end{array}\right)_m$$

wherein m is an integer of 2-4 and $R^5$ and $R^6$ are the same or different radicals selected from hydrogen or unsubstituted or substituted $C_1$-$C_6$ alkyl.

7. The composition of claim 1 wherein the oxazolidine has the following structural formula:

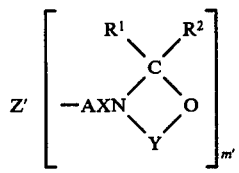

wherein $R^1$ is hydrogen, phenyl, benzyl or $C_1$-$C_{12}$ alkyl; $R^2$ is hydrogen or $C_1$-$C_4$ alkyl or $R^1$ and $R^2$ are joined together with the carbon atom to which they are attached to form a saturated five- or six-membered carbon ring, and Y is the radical

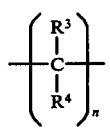

wherein n is 2 or 3 and $R^3$ and $R^4$ are the same or different radicals selected from hydrogen, $C_1$-$C_{12}$ alkyl, ($C_6$-$C_{10}$) aryl or $C_7$-$C_{12}$ aralkyl or alkaryl; X is the radical

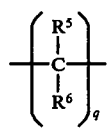

wherein q is an integer of 2 to 4 and $R^5$ and $R^6$ are the same or different radicals selected from hydrogen or unsubstituted or substituted $C_1$-$C_6$ alkyl; Z' is a saturated, polyvalent alkylene radical having up to 38 carbon atoms, a polyvalent phenylene, a polyvalent halosubstituted phenylene, a $C_1$-$C_8$ alkyl-substituted phenylene, the divalent hydrocarbon residue of 1,1,3-trimethyl-5-carboxy-3-(p-carboxyphenyl)indane, an unsaturated divalent alkenyl radical having 2 or 3 carbon atoms or a O=C< group; A is

(the left valence being connected to the Z' radical) or when Z' is

then A is —O— and m' is an integer of at least two and is equal to the valence of Z'.

8. The composition of claim 1 wherein the oxazolidine is a polymer of an unsaturated oxazolidine of the following structural formula:

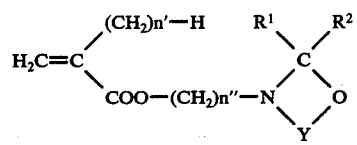

wherein $R^1$ is hydrogen, phenyl, benzyl or $C_1$-$C_{12}$ alkyl; $R^2$ is hydrogen or $C_1$-$C_4$ alkyl or $R^1$ and $R^2$ are joined together with the carbon atom to which they are attached to form a saturated five- or six-membered carbon ring; Y is the radical

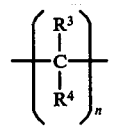

wherein n is 2 or 3 and $R^3$ and $R^4$ are the same or different radicals selected from hydrogen, $C_1$-$C_{12}$ alkyl, $C_6$-$C_{10}$ aryl or $C_7$-$C_{12}$ aralkyl or alkaryl; n' is 1 or 2 and n" is 2 or 3.

9. The composition of claim 1 wherein the polyanhydride is the reaction product of maleic anhydride and tung oil.

10. The composition of claim 1 wherein the polyanhydride is the copolymer of maleic anhydride and butyl acrylate.

11. A process for forming a polymeric material which comprises contacting the composition of claim 1 with water.

12. A polymeric material formed from the composition of claim 1 and water.

13. The polymeric material formed from the composition of claim 9 and water.

14. The polymeric material formed from the composition of claim 10 and water.

15. An article of manufacture comprising a substrate having a coating of the polymeric material of claim 12.

16. An article according to claim 15 wherein the substrate is wood, metal, plastic, paper or leather.

17. A leather having as a topcoat or impregnant the polymeric material of claim 12.

18. An article of manufacture comprising a substrate having a tacky adhesive layer of the polymeric material of claim 15.

* * * * *

UNITED STATES PATENT AND TRADEMARK OFFICE
CERTIFICATE OF CORRECTION

PATENT NO. : 4,043,956

DATED : August 23, 1977

INVENTOR(S) : Thomas W. Hutton et al

It is certified that error appears in the above-identified patent and that said Letters Patent are hereby corrected as shown below:

In column 2, line 41 "$C_7 14 C_{15}$" should read -- $-C_7-C_{15}-$ --

Signed and Sealed this

Thirty-first Day of July 1979

[SEAL]

Attest:

Attesting Officer

LUTRELLE F. PARKER
Acting Commissioner of Patents and Trademarks